US012300447B2

(12) United States Patent
Shi et al.

(10) Patent No.: US 12,300,447 B2
(45) Date of Patent: May 13, 2025

(54) REMOTE SWITCH-OFF MECHANISM AND ROTARY SWITCH

(71) Applicants: Huawei Digital Power Technologies Co., Ltd., Shenzhen (CN); Shanghai Liangxin Electrical Co., Ltd., Shanghai (CN)

(72) Inventors: Jian Shi, Shanghai (CN); Hao Wang, Shanghai (CN); Wei Shi, Shanghai (CN); Xiufeng Zhang, Dongguan (CN); Xiaokang Tian, Shenzhen (CN)

(73) Assignees: Huawei Digital Power Technologies Co., Ltd., Shenzhen (CN); Shanghai Liangxin Electrical Co., Ltd., Shanghai (CN)

( * ) Notice: Subject to any disclaimer, the term of this patent is extended or adjusted under 35 U.S.C. 154(b) by 118 days.

(21) Appl. No.: 18/157,683

(22) Filed: Jan. 20, 2023

(65) Prior Publication Data

US 2023/0154703 A1 May 18, 2023

Related U.S. Application Data

(63) Continuation of application No. PCT/CN2021/100171, filed on Jun. 15, 2021.

(30) Foreign Application Priority Data

Jul. 20, 2020 (CN) ......................... 202010703232.9

(51) Int. Cl.
*H01H 19/24* (2006.01)
*H01H 3/30* (2006.01)

(52) U.S. Cl.
CPC .......... *H01H 19/24* (2013.01); *H01H 3/3042* (2013.01)

(58) Field of Classification Search
CPC .. H01H 1/36; H01H 1/42; H01H 1/44; H01H 1/20; H01H 1/2041; H01H 21/54;
(Continued)

(56) References Cited

U.S. PATENT DOCUMENTS

| | | | | |
|---|---|---|---|---|
| 4,481,492 | A | 11/1984 | Borne et al. | |
| 9,964,189 | B2 * | 5/2018 | Rodríguez Nájera . | H01H 71/00 |
| 2004/0263294 | A1 * | 12/2004 | Ahlert .................. | H01H 71/505 335/132 |

FOREIGN PATENT DOCUMENTS

| | | | |
|---|---|---|---|
| CN | 107045958 | A | 8/2017 |
| CN | 108648970 | A | 10/2018 |

(Continued)

*Primary Examiner* — Anthony R Jimenez
(74) *Attorney, Agent, or Firm* — Leydig, Voit & Mayer, Ltd.

(57) ABSTRACT

A remote switch-off mechanism and a rotary switch relates to the field of electrical technologies. A housing, an energy storage component, and a tripping component are provided. The energy storage component includes a latch, an energy storage spring, a rotating shaft, and an energy storage panel connected to the rotating shaft, an abutting portion is disposed on the energy storage panel, a first end of the energy storage spring is clamped to the housing, and a second end of the energy storage spring abuts against the abutting portion. The latch includes a hinged portion hinged to the housing, a limiting portion for limiting the second end of the energy storage spring, and a tripping portion that cooperates with the tripping component, and an elastic member is disposed between the latch and the housing, so that the tripping portion has a trend of moving toward the tripping component.

14 Claims, 6 Drawing Sheets

(58) Field of Classification Search
CPC H01H 19/24; H01H 3/00; H01H 3/02; H01H 3/30; H01H 3/3005; H01H 3/3015; H01H 3/3031; H01H 3/3042; H01H 3/32; H01H 3/38; H01H 3/42; H01H 71/00; H01H 71/505; H01H 71/52; H01H 71/522; H01H 2001/0047; H01H 2009/20; H01H 2009/26; H01H 2050/32; H01H 2071/505; H01H 9/106; H01H 3/20; H01H 9/20; H01H 9/22; H01H 9/28
USPC .......................................................... 200/400
See application file for complete search history.

(56) References Cited

FOREIGN PATENT DOCUMENTS

| | | | |
|---|---|---|---|
| CN | 108878224 | A | 11/2018 |
| CN | 209401499 | U | 9/2019 |
| CN | 110911187 | A | 3/2020 |
| CN | 112750643 | A | 5/2021 |

* cited by examiner

REMOTE SWITCH-OFF MECHANISM AND ROTARY SWITCH

CROSS-REFERENCE TO RELATED APPLICATIONS

This application is a continuation of International Application No. PCT/CN2021/100171, filed on Jun. 15, 2021, which claims priority to Chinese Patent Application No. 202010703232.9, filed on Jul. 20, 2020. The disclosures of the aforementioned applications are hereby incorporated by reference in their entireties.

TECHNICAL FIELD

The present disclosure relates to the field of electrical technologies, and specifically, to a remote switch-off mechanism and a rotary switch.

BACKGROUND

A switch is an element that opens a circuit, interrupts a current, or enables the current to flow to another circuit. The switch develops from an original knife switch that needs to be manually operated to a current intelligent switch that is used in various large electrical control devices. The switch has increasingly more functions and is more secure.

With the development of technologies, in increasingly more control fields or automation fields, for example, in a photovoltaic power generation technology, there are increasingly more requirements for a remote switching function of a rotary switch. For example, when a fire disaster occurs on a photovoltaic panel, remote control needs to be performed to disconnect a circuit. A commonly used means for implementing the remote switching function is to add a motor at a position of an operation handle of the switch, and switching is performed by using a mechanism in which the motor drives the rotary switch, so that the rotary switch disconnects the circuit.

However, when the mechanism in which the motor controls the rotary switch is used for switching, an entire size of the rotary switch is not only extremely large, but costs are also extremely high. In addition, when switching is performed by using the motor, an action is relatively slow, and when a fault occurs in a system, quick responding cannot be performed.

SUMMARY

The present disclosure provides a remote switch-off mechanism and a rotary switch, so that response time during switching of the rotary switch can be improved.

Embodiments of the present disclosure are implemented as follows:

According to an aspect of embodiments of the present disclosure, a remote switch-off mechanism is provided, and includes a housing, an energy storage component, and a tripping component. The energy storage component includes a latch, an energy storage spring, a rotating shaft, and an energy storage panel connected to the rotating shaft, an abutting portion is disposed on the energy storage panel, a first end of the energy storage spring is clamped to the housing, and a second end of the energy storage spring abuts against the abutting portion. The latch includes a hinged portion hinged to the housing, a limiting portion for limiting the second end of the energy storage spring, and a tripping portion that cooperates with the tripping component, and an elastic member is disposed between the latch and the housing, so that the tripping portion has a trend of moving toward the tripping component. The tripping component is configured to enable the limiting portion to release limiting on the second end of the energy storage spring, so that the rotating shaft rotates to a switch-off position.

Optionally, the housing includes an upper cover, a limiting slot is disposed on the upper cover, and the first end of the energy storage spring is clamped to the housing by using the limiting slot.

Optionally, a hollow post is further disposed on the upper cover, and the rotating shaft passes through the hollow post and is rotatably connected to the upper cover.

Optionally, the energy storage spring includes an energy storage body, and a first torsion arm and a second torsion arm that are separately connected to the energy storage body, and the energy storage body is sleeved on an outer circle of the hollow post.

Optionally, a guide surface is disposed between the hinged portion and the limiting portion, and a limiting surface is disposed on a side that is of the limiting portion and that is away from the guide surface.

Optionally, a limiting protrusion is disposed between the tripping portion and the limiting portion, the housing further includes a mounting base connected to the upper cover, and the limiting protrusion cooperates with the mounting base to limit the latch.

Optionally, the elastic member is disposed between the latch and the upper cover, or the elastic member is disposed between the latch and the mounting base.

Optionally, the latch includes a support body, and the tripping portion includes a folded edge connected to the support body and a force-bearing portion connected to the folded edge.

Optionally, the tripping component is any one of a magnetic flux converter, a shunt release, an undervoltage release, or an overvoltage release.

According to another aspect of embodiments of the present disclosure, a rotary switch is provided, and includes the remote switch-off mechanism described in any implementation above and an on-off component connected to the remote switch-off mechanism. The on-off component includes a fixed-contact component and a moving-contact component that is connected to the remote switch-off mechanism for transmission.

Beneficial effects of embodiments of the present disclosure include:

According to the remote switch-off mechanism and the rotary switch that are provided in embodiments of the present disclosure, the rotating shaft and the energy storage panel connected to the rotating shaft are used. The abutting portion is disposed on the energy storage panel, the first end of the energy storage spring is clamped to the housing, and the second end of the energy storage spring abuts against the abutting portion. When the rotating shaft enables the energy storage panel to synchronously rotate with the rotating shaft, the abutting portion of the energy storage panel drives the second end of the energy storage spring to move with the energy storage panel, and because the first end of the energy storage spring is clamped to the housing, the energy storage spring is elastically deformed in a moving process of the energy storage panel, and therefore elastic potential energy is generated, and the rotary switch is switched off. The latch includes the hinged portion hinged to the housing, the limiting portion for limiting the second end of the energy storage spring, and the tripping portion that cooperates with the tripping component, and the elastic member is disposed between the latch and the housing, so that the tripping portion has the trend of moving toward the tripping component. Because the tripping portion has the trend of moving toward the tripping component, and the hinged portion of the latch is hinged to the housing, in a process in which the abutting portion of the energy storage panel drives the second end of the energy storage spring to move with the energy storage panel, the second end of the energy storage spring is clamped to the limiting portion, so that the elastic potential energy generated by the energy storage spring is maintained. When in operation, the tripping component overcomes acting force of the elastic member to drive the tripping portion to move away from the tripping component, so that the second end of the energy storage spring is detached from the limiting portion of the latch, and the latch no longer limits the second end of the energy storage spring. In a process in which the energy storage spring restores from elastic deformation, the abutting portion of the energy storage panel drives the energy storage panel to rotate back, so that the rotary switch is switched off. A switching off process is implemented by using the elastic potential energy accumulated in the energy storage spring without being driven by a motor, so that response time during switching of the rotary switch can be improved.

BRIEF DESCRIPTION OF DRAWINGS

To describe the technical solutions of embodiments of the present disclosure more clearly, the following briefly describes accompanying drawings that need to be used in the embodiments. It should be understood that the following accompanying drawings show merely some embodiments of the present disclosure, and therefore should not be construed as a limitation on the scope. A person of ordinary skill in the art may still derive other related accompanying drawings from these accompanying drawings without creative efforts.

Figure 1:
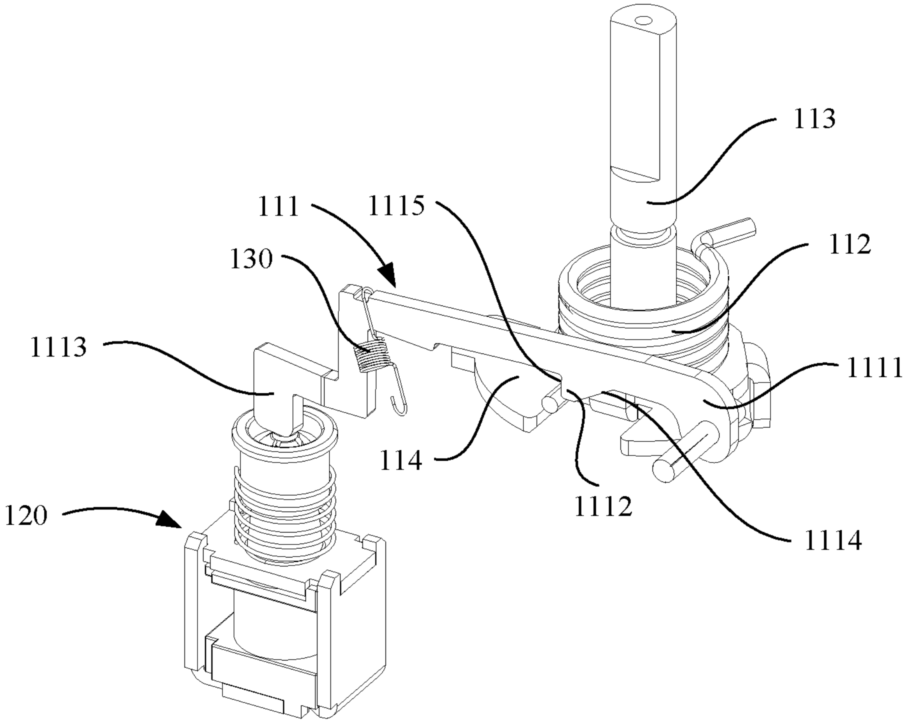
FIG. 1 is a schematic diagram of a structure in which an energy storage component cooperates with a tripping component according to an embodiment of the present disclosure.

Reference numerals: 110—Energy storage component; 111—Latch; 1111—Hinged portion; 1112—Limiting portion; 1113—Tripping portion; 1114—Guide surface; 1115—Limiting surface; 1116—Limiting protrusion; 1117—Support body; 1118—Folded edge; 1119—Force-bearing portion; 112—Energy storage spring; 1122—Energy storage body; 1124—First torsion arm; 1126—Second torsion arm; 113—Rotating shaft; 114—Energy storage panel; 1142—Abutting portion; 120—Tripping component; 130—Elastic member; 140—Upper cover; 142—Limiting slot; 144—Hollow post.

DESCRIPTION OF EMBODIMENTS

To make the objectives, technical solutions, and advantages of embodiments of the present disclosure clearer, the following clearly describes the technical solutions in embodiments of the present disclosure with reference to the accompanying drawings in embodiments of the present disclosure. It is clear that the described embodiments are a part but not all of embodiments of the present disclosure. Components in embodiments of the present disclosure that are described and illustrated in the accompanying drawings herein may generally be arranged and designed in various different configurations.

Therefore, the following detailed descriptions of embodiments of the present disclosure provided in the accompanying drawings are not intended to limit the scope of the present disclosure as claimed, but merely represent selected embodiments of the present disclosure. Other embodiments obtained by a person of ordinary skill in the art based on embodiments of the present disclosure without creative efforts shall fall within the protection scope of the present disclosure.

It should be noted that similar reference numerals and letters denote similar items in the following accompanying drawings, and therefore, once an item is defined in one of the accompanying drawings, the item does not need to be further defined or explained in subsequent accompanying drawings. In addition, terms “first”, “second”, and the like are used only to distinguish descriptions, and cannot be understood as an indication or an implication of relative importance.

In descriptions of the present disclosure, it should be further noted that, unless otherwise specified and limited, terms “dispose” and “connection” should be understood in a broad sense, for example, may be a fixed connection, a detachable connection, or an integral connection, may be a mechanical connection or an electrical connection, or may be a direct connection, an indirect connection established by using an intermediate medium, or a connection inside two elements. A person of ordinary skill in the art may understand specific meanings of the foregoing terms in the present disclosure in a specific case.

Figure 2:
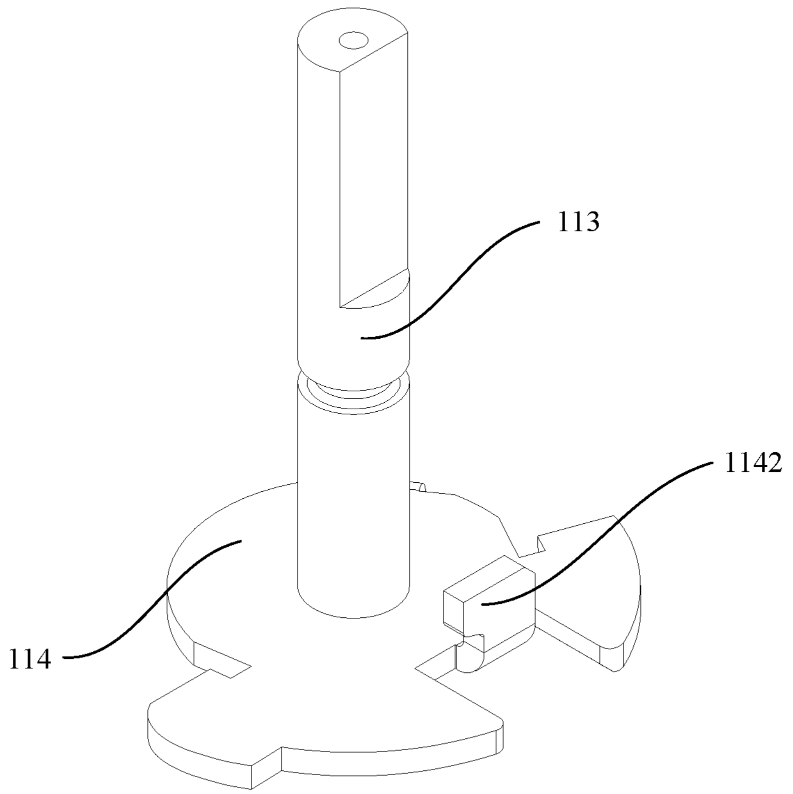
FIG. 2 is a schematic diagram of a structure in which a rotating shaft is connected to an energy storage panel according to an embodiment of the present disclosure.
Figure 3:
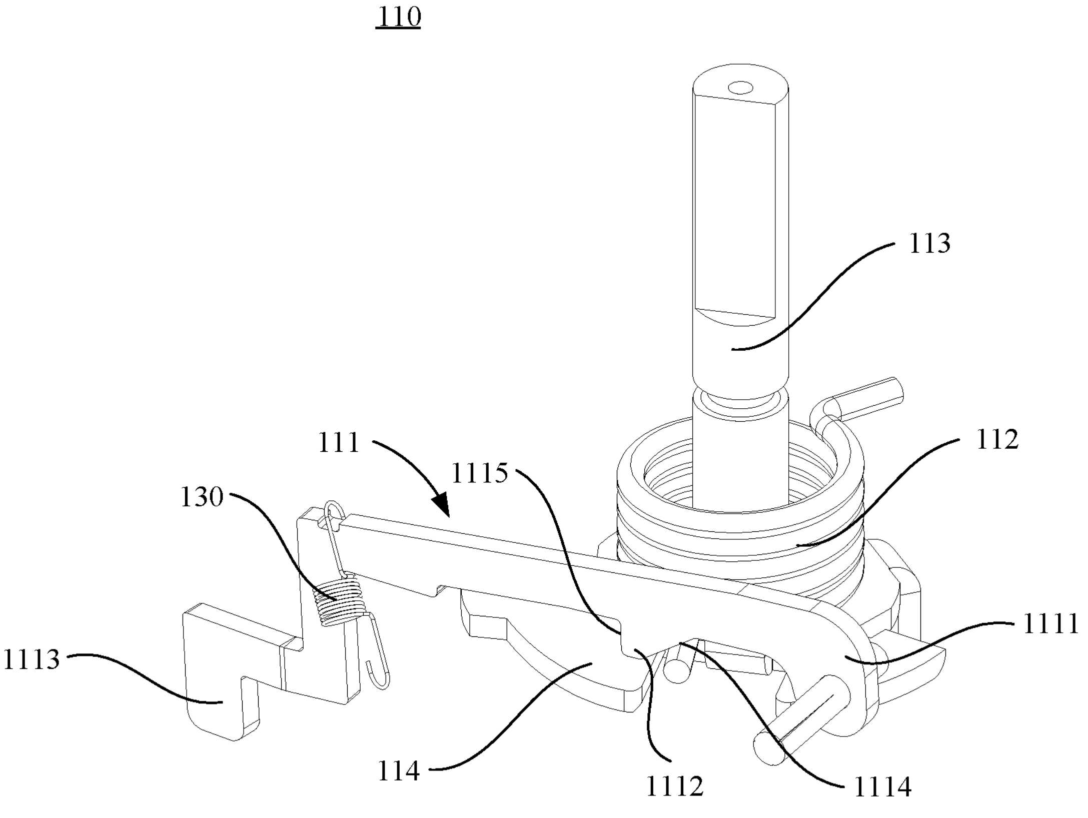
FIG. 3 is a schematic diagram 1 of a structure of an energy storage component according to an embodiment of the present disclosure.

As shown in FIG. 1 to FIG. 3, an embodiment provides a remote switch-off mechanism, including a housing, an energy storage component 110, and a tripping component 120. The energy storage component 110 includes a latch 111, an energy storage spring 112, a rotating shaft 113, and an energy storage panel 114 connected to the rotating shaft 113. An abutting portion 1142 is disposed on the energy storage panel 114, a first end of the energy storage spring 112 is clamped to the housing, and a second end of the energy storage spring 112 can abut against the abutting portion 1142. The latch 111 includes a hinged portion 1111 hinged to the housing, a limiting portion 1112 for limiting the second end of the energy storage spring 112, and a tripping portion 1113 that cooperates with the tripping component 120, and an elastic member 130 is disposed between the latch 111 and the housing, so that the tripping portion 1113 has a trend of moving toward the tripping component 120. The tripping component 120 is configured to enable the limiting portion 1112 to release limiting on the second end of the energy storage spring 112, so that the rotating shaft 113 rotates to a switch-off position.

For example, a form of a connection between the rotating shaft 113 and the energy storage panel 114 is not specifically limited in this embodiment of the present disclosure provided that a required transmission requirement and a stable connection can be met. For example, the rotating shaft 113 and the energy storage panel 114 may be fixedly connected, for example, are riveted, welded, or integrated, or may be in a form of an assembly connection, for example, are sleeved, clamped, or in a threaded connection.

In addition, a position at which the energy storage spring 112 is disposed is not specifically limited in this application. For example, the energy storage spring 112 may be sleeved on the rotating shaft 113, or may be disposed on the housing, provided that it can be ensured that the first end of the energy storage spring 112 is fastened through clamping, and the second end can abut against the abutting portion 1142 of the energy storage panel 114, so that when the rotating shaft 113 rotates, the energy storage spring 112 can store energy. When the energy storage spring 112 is sleeved on the rotating shaft 113, the energy storage spring 112 may be in a form of a torsion spring. When the energy storage spring 112 is disposed on the housing, a form of a torsion spring may be used, or a form of an extension spring or a compression spring may be used. When the extension spring or the compression spring is used, a channel of the extension spring or the compression spring is correspondingly disposed on the housing.

It may be understood that the tripping component 120 is configured to: receive a control signal, and perform an action based on the control signal, so that the latch 111 can release limiting on the second end of the energy storage spring 112. For example, acting force may be applied on the tripping portion 1113, so that the tripping portion 1113 moves away from a position at which the tripping component 120 is located. In a process in which the tripping portion 1113 moves away from the tripping component 120, relative rotation occurs between the hinged portion 1111 of the latch 111 and the housing, so that a position of the limiting portion 1112 of the latch 111 moves, and the second end of the energy storage spring 112 is no longer limited. Therefore, the energy storage spring 112 may restore from elastic deformation, and drive the energy storage panel 114 to move to enable the energy storage panel 114 to move to a switch-off position, so that a switch-off operation of the rotary switch is completed.

According to the remote switch-off mechanism provided in this embodiment of the present disclosure, the rotating shaft 113 and the energy storage panel 114 connected to the rotating shaft 113 are used. The abutting portion 1142 is disposed on the energy storage panel 114, the first end of the energy storage spring 112 is clamped to the housing, and the second end of the energy storage spring 112 abuts against the abutting portion 1142. When the rotating shaft 113 enables the energy storage panel 114 to synchronously rotate with the rotating shaft 113, the abutting portion 1142 of the energy storage panel 114 drives the second end of the energy storage spring 112 to move with the energy storage panel 114, and because the first end of the energy storage spring 112 is clamped to the housing, the energy storage spring 112 is elastically deformed in a moving process of the energy storage panel 114, and therefore elastic potential energy is generated, and the rotary switch is switched off. The latch 111 includes the hinged portion 1111 hinged to the housing, the limiting portion 1112 for limiting the second end of the energy storage spring 112, and the tripping portion 1113 that cooperates with the tripping component 120, and the elastic member 130 is disposed between the latch 111 and the housing, so that the tripping portion 1113 has the trend of moving toward the tripping component 120. Because the tripping portion 1113 has the trend of moving toward the tripping component 120, and the hinged portion 1111 of the latch 111 is hinged to the housing, in a process in which the abutting portion 1142 of the energy storage panel 114 drives the second end of the energy storage spring 112 to move with the energy storage panel 114, the second end of the energy storage spring 112 is clamped to the limiting portion 1112, so that the elastic potential energy generated by the energy storage spring 112 is maintained. When in operation, the tripping component 120 overcomes acting force of the elastic member 130 to drive the tripping portion 1113 to move away from the tripping component 120, so that the second end of the energy storage spring 112 is detached from the limiting portion 1112 of the latch 111, and the latch 111 no longer limits the second end of the energy storage spring 112. In a process in which the energy storage spring 112 restores from elastic deformation, the abutting portion 1142 of the energy storage panel 114 drives the energy storage panel 114 to rotate back, so that the rotary switch is switched off. A switching off process is implemented by using the elastic potential energy accumulated in the energy storage spring 112 without being driven by a motor, so that response time during switching of the rotary switch can be improved.

Figure 5:
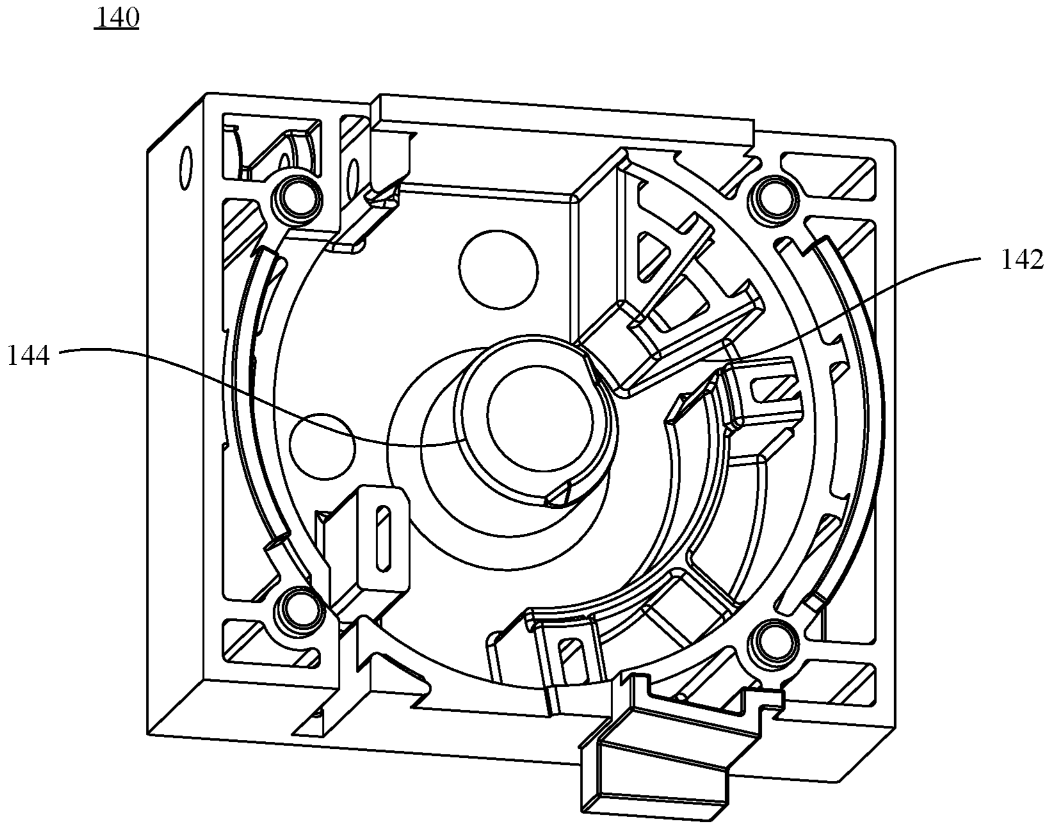
FIG. 5 is a schematic diagram of a structure of an upper cover according to an embodiment of the present disclosure.

As shown in FIG. 5, the housing includes an upper cover 140, a limiting slot 142 is disposed on the upper cover 140, and the first end of the energy storage spring 112 is clamped to the housing by using the limiting slot 142. In this way, positions of the first end of the energy storage spring 112 and the housing can be relatively fixed, and this helps improve stability during use of the energy storage spring 112, ensures that the energy storage spring 112 can normally store energy and drive the energy storage panel 114 to rotate in a process of restoring from elastic deformation, and helps improve stability during switching off Referring to FIG. 5 again, a hollow post 144 is further disposed on the upper cover 140, and the rotating shaft 113 passes through the hollow post 144, and is rotatably connected to the upper cover 140. Specifically, the rotating shaft 113 is connected to an inner side and an outer side of the upper cover 140, to interoperate with the rotary switch by using the rotating shaft 113. The rotating shaft 113 is disposed in a manner of passing through the hollow post 144, so that stability can be improved when the rotating shaft 113 rotates, and shaking of the rotating shaft 113 in a radial direction is avoided, and this helps improve precision and stability in a rotary connection.

Figure 6:
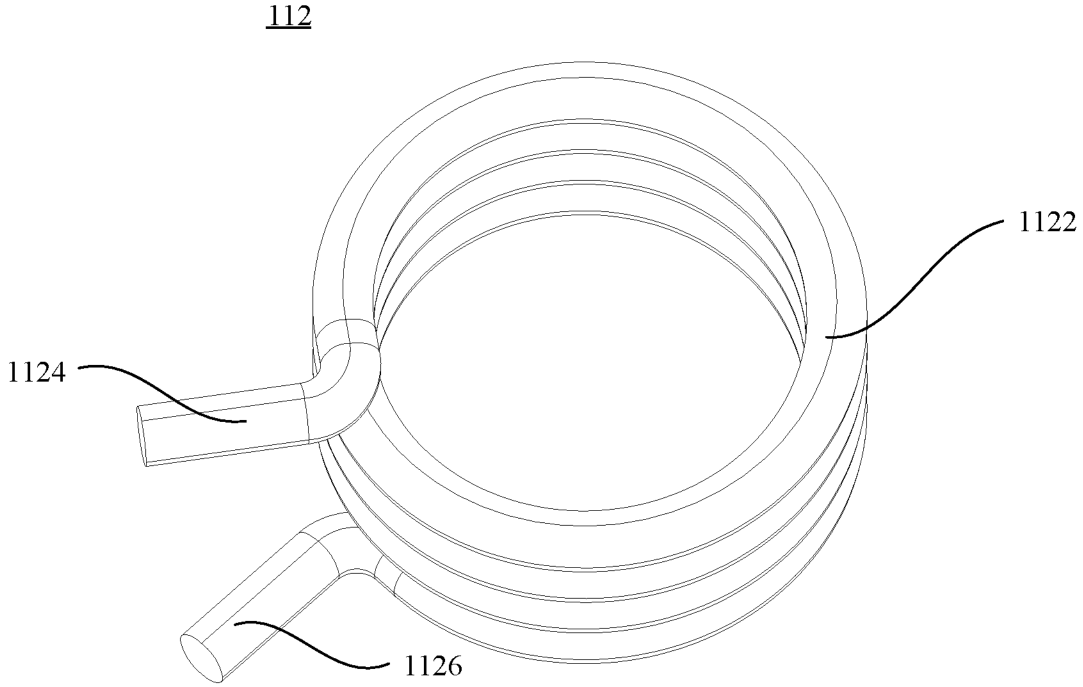
FIG. 6 is a schematic diagram of a structure of an energy storage spring according to an embodiment of the present disclosure.

As shown in FIG. 5 and FIG. 6, the energy storage spring 112 includes an energy storage body 1122, and a first torsion arm 1124 and a second torsion arm 1126 that are separately connected to the energy storage body 1122. The energy storage body 1122 is sleeved on an outer circle of the hollow post 144.

For example, the energy storage body 1122 is sleeved on the outer circle of the hollow post 144, so that the energy storage spring 112 can be limited, to prevent lateral deviation of the energy storage spring 112 from affecting clamping between the first end (that is, the first torsion arm 1124) of the energy storage spring 112 and the housing. In addition, it can also be ensured that the second end (that is, the second torsion arm 1126) of the energy storage spring 112 abuts against the abutting portion 1142 of the energy storage panel 114, to prevent occurrence of misplacement from affecting energy storage of the energy storage spring 112. In addition, the second torsion arm 1126 of the energy storage spring 112 better cooperates with the limiting portion 1112 of the latch 111, to avoid a case in which energy storage of the energy storage spring 112 is affected because the second torsion arm 1126 is detached from the limiting portion 1112 due to shaking of the energy storage spring 112.

In the foregoing disposing form, not only stability can be ensured during use of the energy storage spring 112, but also cooperation between the energy storage spring 112, the upper cover 140, and the rotating shaft 113 can be more compact, and internal space is fully utilized. This helps implement miniaturization of the remote switch-off mechanism.

Figure 4:
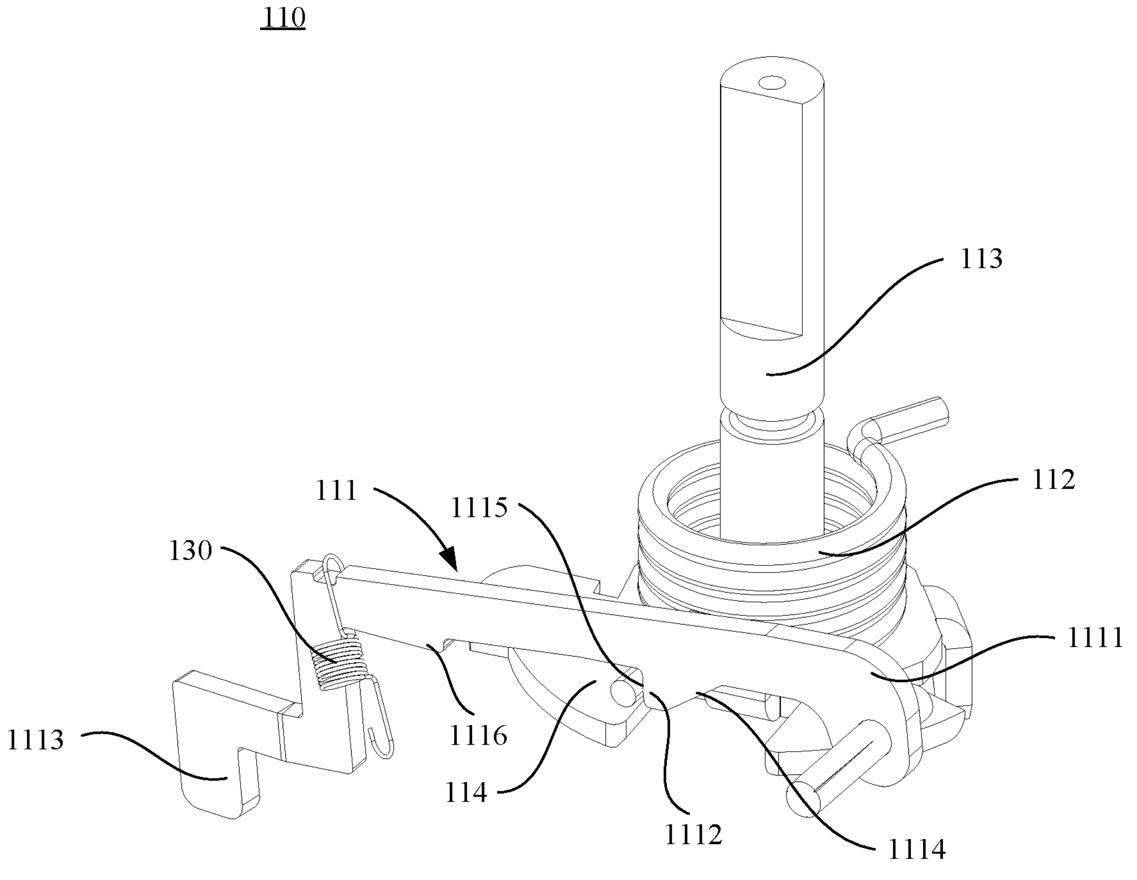
FIG. 4 is a schematic diagram 2 of a structure of an energy storage component according to an embodiment of the present disclosure.

As shown in FIG. 3 and FIG. 4, a guide surface 1114 is disposed between the hinged portion 1111 and the limiting portion 1112, and a limiting surface 1115 is disposed on a side that is of the limiting portion 1112 and that is away from the guide surface 1114.

For example, when the rotating shaft 113 drives the energy storage panel 114 to rotate, the abutting portion 1142 on the energy storage panel 114 drives the second torsion arm 1126 to rotate with the energy storage panel 114. When the second torsion arm 1126 moves, the second torsion arm 1126 abuts against the guide surface 1114, and moves along the guide surface 1114 toward a position of the limiting portion 1112. When the second torsion arm 1126 moves to the side that is of the limiting portion 1112 and that is away from the guide surface 1114, that is, the second torsion arm 1126 moves to a side that is of the limiting portion 1112 and on which the limiting surface 1115 is disposed, the second torsion arm 1126 is limited by the limiting portion 1112, and even if the energy storage panel 114 no longer applies force on the second torsion arm 1126, the second torsion arm 1126 cannot restore to an initial state. In this way, an energy storage operation of the energy storage spring 112 is implemented.

When the tripping component 120 receives a tripping signal, the tripping component 120 performs an action, so that the tripping portion 1113 overcomes acting force of the elastic member 130 to move away from the position of the tripping component 120. In a moving process of the tripping portion 1113, a limiting amount of the limiting surface 1115 on the second torsion arm 1126 of the energy storage spring 112 gradually decreases until the second torsion arm 1126 is released from a limiting action of the limiting portion 1112. After the second torsion arm 1126 is released from the action of the limiting portion 1112 of the latch 111, the elastic potential energy accumulated in the energy storage spring 112 is released, and the abutting portion 1142 drives the energy storage panel 114 to rotate the switch-off position, so that the rotary switch is switched off.

As shown in FIG. 4, a limiting protrusion 1116 is disposed between the tripping portion 1113 and the limiting portion 1112. The housing further includes a mounting base (not shown in the figure) connected to the upper cover 140, and the limiting protrusion 1116 cooperates with the mounting base to limit the latch 111.

For example, when the tripping component 120 is restored to a state before the action, under an action of the elastic member 130, the latch 111 rotates by using the hinged portion 1111, so that the tripping portion 1113 has a trend of moving toward the tripping component 120. The limiting protrusion 1116 is disposed between the tripping portion 1113 and the limiting portion 1112, so that in a process in which the tripping portion 1113 moves toward the tripping component 120, the mounting base limits a moving range of the latch 111. In this way, striking between the tripping portion 1113 and the tripping component 120 is avoided, and this helps improve stability during use of the tripping component 120.

In an optional embodiment of the present disclosure, the elastic member 130 may be disposed between the latch 111 and the upper cover 140, or the elastic member 130 is disposed between the latch 111 and the mounting base.

For example, when the elastic member 130 is disposed between the latch 111 and the upper cover 140, the elastic member 130 may be in a form such as a compression spring or a spring plate, so that there is repulsive force between the latch 111 and the upper cover 140, and therefore, the tripping portion 1113 has the trend of moving toward the tripping component 120. When the elastic member 130 is disposed between the latch 111 and the mounting base, the elastic member 130 may be in a form of an extension spring or an elastic rope, so that the tripping portion 1113 has the trend of moving toward the tripping component 120. It is ensured that the limiting portion 1112 can stably limit the second torsion arm 1126 of the energy storage spring 112.

Figure 7:
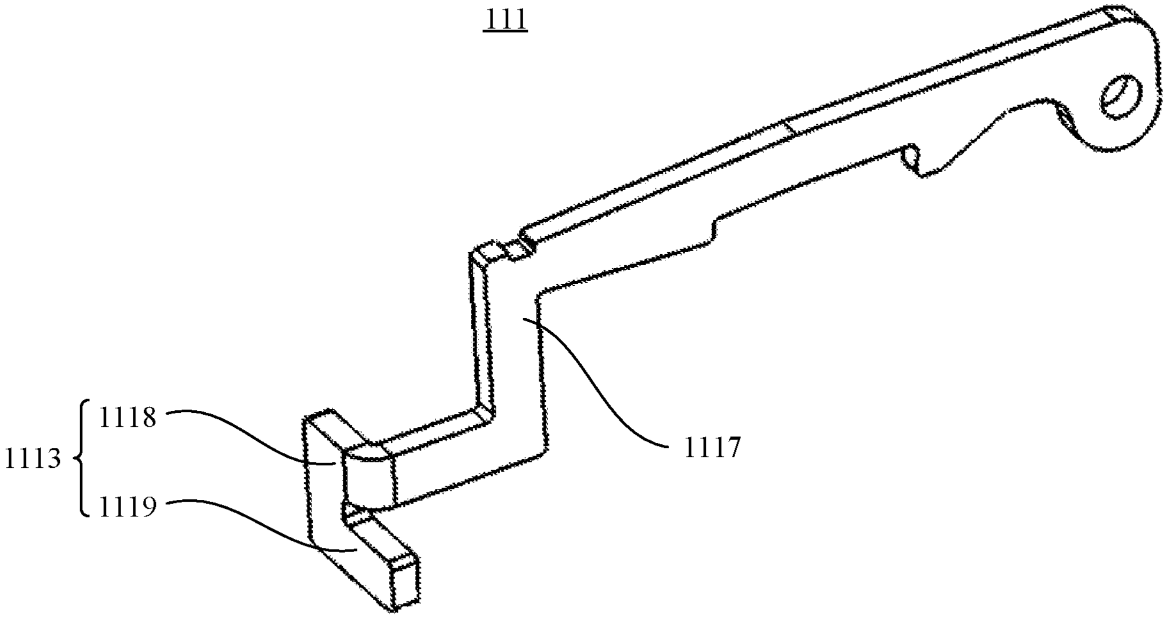
FIG. 7 is a schematic diagram of a structure of a latch according to an embodiment of the present disclosure.

As shown in FIG. 7, the latch 111 includes a support body 1117, and the tripping portion 1113 includes a folded edge 1118 connected to the support body 1117, and a force-bearing portion 1119 connected to the folded edge 1118. Specifically, there is a preset included angle between a plane in which the folded edge 1118 is located and a plane in which the support body 1117 is located, and the included angle is preferably 90°. In this way, contact reliability between the latch 111 and the tripping component 120 can be improved, so that the latch 111 can be reliably driven when the tripping component 120 performs an action, and therefore, the latch 111 releases limiting on the energy storage spring 112.

Optionally, the tripping component 120 is any one of a magnetic flux converter, a shunt release, an undervoltage release, or an overvoltage release. An action of the tripping component 120 is controlled by using an electrical signal, so that the latch 111 releases limiting on the energy storage spring 112, and therefore, the rotary switch responds rapidly to implement a remote switch-off function.

An embodiment of the present disclosure further discloses a rotary switch, and the rotary switch includes the remote switch-off mechanism in the foregoing embodiment and an on-off component connected to the remote switch-off mechanism. The on-off component includes a fixed-contact component and a moving-contact component that is connected to the remote switch-off mechanism for transmission. The remote switch-off mechanism drives the fixed-contact component and the moving-contact component to move, to implement switch-off or switch-on. The rotary switch includes a same structure and same beneficial effects as the remote switch-off mechanism in the foregoing embodiment. A structure and beneficial effects of the remote switch-off mechanism are described in detail in the foregoing embodiment, and details are not described herein again.

The foregoing descriptions are merely preferred embodiments of the present disclosure, and are not intended to limit the present disclosure. For a person skilled in the art, various changes and variations may be made to the present disclosure. Any modification, equivalent replacement, or improvement made without departing from the principle of the present disclosure shall fall within the protection scope of the present disclosure.

What is claimed is:

1. A remote switch-off mechanism, comprising:

a housing, an energy storage component, and a tripping component, wherein the energy storage component comprises a latch, an energy storage spring, a rotating shaft, and an energy storage panel connected to the rotating shaft; an abutting portion is disposed on the energy storage panel, a first end of the energy storage spring is clamped to the housing, and a second end of the energy storage spring abuts against the abutting portion;

the latch comprises a hinged portion hinged to the housing, a limiting portion configured to engage with, and to limit a motion of, the second end of the energy storage spring, a tripping portion, and an elastic member is disposed between the latch and the housing, wherein the tripping portion has a bias of moving toward the tripping component; and the tripping component is configured to enable the limiting portion to disengage with the second end of the energy storage spring so that the limiting portion no longer limits the motion of the second end of the energy storage spring, wherein the rotating shaft rotates to a switch-off position.

2. The remote switch-off mechanism according to claim 1, wherein a guide surface is disposed between the hinged portion and the limiting portion, and a limiting surface is disposed on a side of the limiting portion that is away from the guide surface.

3. The remote switch-off mechanism according to claim 1, wherein the latch comprises a support body, and the tripping portion comprises a folded edge connected to the support body and a force-bearing portion connected to the folded edge.

4. The remote switch-off mechanism according to claim 1, wherein the tripping component is any one of a magnetic flux converter, a shunt release, an undervoltage release, or an overvoltage release.

5. The remote switch-off mechanism according to claim 1, wherein the housing comprises an upper cover, a limiting slot is disposed on the upper cover, and the first end of the energy storage spring is clamped to the housing by the limiting slot.

6. The remote switch-off mechanism according to claim 5, wherein a hollow post is further disposed on the upper cover, and the rotating shaft passes through the hollow post and is rotatably connected to the upper cover.

7. The remote switch-off mechanism according to claim 6, wherein the energy storage spring comprises an energy storage body, and a first torsion arm and a second torsion arm that are separately connected to the energy storage body, and the energy storage body is sleeved on an outer circle of the hollow post.

8. The remote switch-off mechanism according to claim 5, wherein a limiting protrusion is disposed between the tripping portion and the limiting portion, the housing further comprises a mounting base connected to the upper cover, and the limiting protrusion cooperates with the mounting base to limit the latch.

9. The remote switch-off mechanism according to claim 8, wherein the elastic member is disposed between the latch and the upper cover, or the elastic member is disposed between the latch and the mounting base.

10. A rotary switch, comprising a remote switch-off mechanism and an on-off component connected to the remote switch-off mechanism, wherein the on-off component comprises a fixed-contact component and a moving-contact component that is connected to the remote switch-off mechanism for transmission;

wherein the remote switch-off mechanism comprises a housing, an energy storage component, and a tripping component, wherein the energy storage component comprises a latch, an energy storage spring, a rotating shaft, and an energy storage panel connected to the rotating shaft;

an abutting portion is disposed on the energy storage panel, a first end of the energy storage spring is clamped to the housing, and a second end of the energy storage spring abuts against the abutting portion;

the latch comprises a hinged portion hinged to the housing, a limiting portion configured to engage with, and to limit a motion of, the second end of the energy storage spring, a tripping portion, and an elastic member is disposed between the latch and the housing, wherein the tripping portion has a bias of moving toward the tripping component; and the tripping component is configured to enable the limiting portion to disengage with the second end of the energy storage spring so that the limiting portion no longer limits the motion of the second end of the energy storage spring, wherein the rotating shaft rotates to a switch-off position.

11. The rotary switch according to claim 10, wherein a guide surface is disposed between the hinged portion and the limiting portion, and a limiting surface is disposed on a side of the limiting portion that is away from the guide surface.

12. The rotary switch according to claim 10, wherein the housing comprises an upper cover, a limiting slot is disposed on the upper cover, and the first end of the energy storage spring is clamped to the housing by the limiting slot.

13. The rotary switch according to claim 12, wherein a hollow post is further disposed on the upper cover, and the rotating shaft passes through the hollow post and is rotatably connected to the upper cover.

14. The rotary switch according to claim 13, wherein the energy storage spring comprises an energy storage body, and a first torsion arm and a second torsion arm that are separately connected to the energy storage body, and the energy storage body is sleeved on an outer circle of the hollow post.

* * * * *